(12) United States Patent
Tomita (10) Patent No.: US 11,303,319 B2
(45) Date of Patent: Apr. 12, 2022

(54) RADIO FREQUENCY MODULE AND COMMUNICATION DEVICE

(71) Applicant: Murata Manufacturing Co., Ltd., Nagaokakyo (JP)

(72) Inventor: Naohide Tomita, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/099,820

(22) Filed: Nov. 17, 2020

(65) Prior Publication Data

US 2021/0159936 A1    May 27, 2021

(30) Foreign Application Priority Data

Nov. 21, 2019    (JP) .............................. JP2019-210735

(51) Int. Cl.
*H04B 1/04*    (2006.01)
*H04B 1/40*    (2015.01)
*H04B 1/44*    (2006.01)

(52) U.S. Cl.
CPC ..................................... *H04B 1/44* (2013.01)

(58) Field of Classification Search
CPC ........ H04B 1/006; H04B 1/0067; H04B 1/04; H04B 1/0458; H04B 1/38; H04B 1/3827; H04B 1/3833; H04B 1/40; H04B 1/44; H04W 88/02; H04W 88/06
See application file for complete search history.

(56) References Cited

U.S. PATENT DOCUMENTS

| | | | | |
|---|---|---|---|---|
| 6,973,330 | B2* | 12/2005 | Wieck ................. | H04B 1/3838 455/78 |
| 7,608,922 | B2* | 10/2009 | Danno ................ | H03G 3/3036 257/691 |
| 8,400,307 | B2* | 3/2013 | Kataya .................... | H01Q 1/48 340/572.8 |
| 9,843,291 | B2* | 12/2017 | Chang ................... | H04B 1/006 |
| 10,431,887 | B2* | 10/2019 | Kim ....................... | G06F 3/0412 |
| 10,912,195 | B2* | 2/2021 | Wu ......................... | H04B 1/38 |
| 2003/0220129 | A1* | 11/2003 | Pan ......................... | H04B 15/02 455/575.1 |
| 2020/0253040 | A1* | 8/2020 | Dalmia ................... | H01L 25/18 |
| 2021/0203372 | A1* | 7/2021 | Yoshida .................. | H04B 1/40 |

FOREIGN PATENT DOCUMENTS

JP    2007-281160 A    10/2007

* cited by examiner

*Primary Examiner* — Quochien B Vuong
(74) *Attorney, Agent, or Firm* — Xsensus LLP (57) ABSTRACT

A radio frequency module includes: a module board including a first principal surface and a second principal surface on opposite sides of the module board; a semiconductor integrated circuit (IC) that is on the second principal surface and includes a third principal surface and a fourth principal surface on opposite sides of the semiconductor IC; and an external-connection terminal on the second principal surface. In this radio frequency module, the third principal surface faces the second principal surface, and is closer to the second principal surface than the fourth principal surface is. The semiconductor IC includes: a reception low noise amplifier; and a ground electrode on the fourth principal surface.

14 Claims, 8 Drawing Sheets

RADIO FREQUENCY MODULE AND COMMUNICATION DEVICE

CROSS REFERENCE TO RELATED APPLICATION

The present application is based on and claims priority of Japanese Patent Application No. 2019-210735 filed on Nov. 21, 2019. The entire disclosure of the above-identified application, including the specification, drawings and claims is incorporated herein by reference in its entirety.

TECHNICAL FIELD

The present disclosure relates to a radio frequency (RF) module and a communication device.

BACKGROUND

With developments in multiband and multimode technologies, there is a demand for small-sized radio frequency modules in which a plurality of radio frequency components are mounted at high density.

Japanese Unexamined Patent Application Publication No. 2007-281160 discloses a circuit-component built-in module that includes a multilayer circuit board, a semiconductor element (semiconductor integrated circuit (IC)) formed on one principal surface of the multilayer circuit board, and via holes (external-connection terminals) provided in the one principal surface.

SUMMARY

Technical Problems

However, as recognized by the present inventor, with the circuit-component built-in module disclosed in Japanese Unexamined Patent Application Publication No. 2007-281160, in the case where the semiconductor IC which includes a radio frequency active element is mounted on the multilayer circuit board, there is a concern that radio frequency noise from the semiconductor IC and digital noise for controlling the semiconductor IC may flow into peripheral circuit components, and noise from the peripheral circuit components may flow into the semiconductor IC. In order to reduce the impacts of such radio frequency noise and digital noise, it is necessary to strengthen electromagnetic shielding performance of the semiconductor IC.

In view of the above-described, and other, circumstances, the present disclosure is to provide a small-sized radio frequency module and a communication device including the same in which electromagnetic shielding performance of a semiconductor IC including a radio frequency active element is strengthened.

Solutions

A radio frequency module according to an aspect of the present disclosure is a radio frequency module including: a module board including a first principal surface and a second principal surface on opposite sides of the module board; a semiconductor integrated circuit (IC) on the second principal surface; and an external-connection terminal on the second principal surface. In this radio frequency module, the semiconductor IC includes a third principal surface and a fourth principal surface on opposite sides of the semiconductor IC. Here, the third principal surface faces the second principal surface, and is closer to the second principal surface than the fourth principal surface is. The semiconductor IC includes: a reception low noise amplifier; and a first ground electrode on the fourth principal surface.

Advantageous Effects

According to the present disclosure, it is possible to provide a small-sized radio frequency module and a communication device in which electromagnetic shielding performance of a semiconductor IC including a radio frequency active element is strengthened.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, embodiments of the present disclosure will be described in detail. Note that the embodiments described below illustrate general or specific examples. The numerical values, shapes, materials, constituent elements, the arrangement and connection of the constituent elements, etc., illustrated in the following embodiments, working example, and variations are mere examples, and are therefore not intended to limit the present disclosure. Among the constituent elements in the following working example and variations, constituent elements not recited in the independent claims will be described as optional constituent elements. In addition, the sizes of the constituent elements and the ratios of the sizes illustrated in the drawings are not necessarily precise. In the drawings, essentially the same constituent elements share the same reference signs, and redundant descriptions will be omitted or simplified.

In the following description, value ranges, terms indicating relationships between elements such as "parallel" and "vertical", and terms indicating the shapes of elements such as "quadrilateral" do not have the meanings in the strict sense only, but include essentially equivalent value ranges and meanings, for example deviations of about a few percent.

Additionally, in the following description, when A, B, and C are mounted on a board, and C is disposed between A and B in a plan view of the board (or in a plan view of a principal surface of the board), it means that a straight line connecting a given point in A and a given point in B passes through the region of C in the plan view of the board. Furthermore, a plan view of the board is a view of the board and circuit elements mounted on the board obtained by orthographic projection on a plane parallel to the board.

In the following description, a "transmission path" refers to a transfer path including, for example, a line for propagating radio frequency transmission signals, an electrode directly connected to the line, and a terminal directly connected to the line or the electrode. A "reception path" refers to a transfer path including, for example, a line for propagating radio frequency reception signals, an electrode directly connected to the line, and a terminal directly connected to the line or the electrode.

In addition, in the following description, the expression "A and B are connected" applies not only when A and B are physically connected, but also when A and B are electrically connected.

Embodiment

[1. Circuit Configuration of Radio Frequency Module 1 and Communication Device 5]

Figure 1:
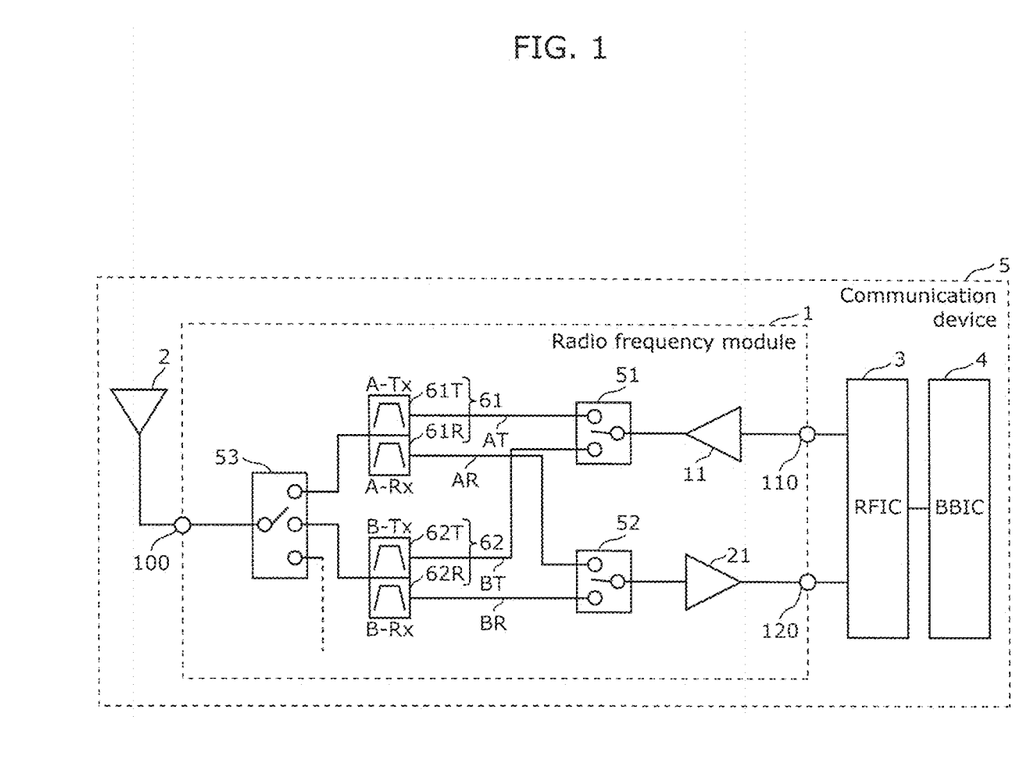
FIG. 1 illustrates a circuit configuration of a radio frequency module (or RF front-end circuitry) and a communication device according to an embodiment.

FIG. 1 illustrates a circuit configuration of radio frequency module 1 and communication device 5 according to an embodiment. As illustrated in the figure, communication device 5 includes radio frequency module 1, antenna 2, radio frequency (RF) signal processing circuit (RF integrated circuit (IC)) 3, and baseband signal processing circuit (BBIC) 4. In this exemplary configuration the communication device 5 is a multi-band transceiver. As used in this specification the term "module", as used with "radio frequency module", or "RF front-end module" should be construed as circuitry (programmable, as well as discrete) and associated circuit components, such as circuit boards, RF shielding, etc.

RFIC 3 is an RF signal processing circuit that processes a radio frequency signal which is to be transmitted by antenna 2 and a radio frequency signal which has been received by antenna 2. Specifically, RFIC 3 processes reception signals input via reception paths of radio frequency module 1 by down-conversion, for example, and outputs resultant reception signals to BBIC 4. RFIC 3 also processes transmission signals input from BBIC 4 by up-conversion, for example, and outputs resultant transmission signals to transmission paths of radio frequency module 1. In the following, a "transmission path" or "transmission signal path" means a transfer route that includes, for instance, a line through which a radio frequency transmission signal propagates, an electrode directly connected to the line, and a terminal directly connected to the line or the electrode. Further, a "reception path" means a transfer route that includes, for instance, a line through which a radio frequency reception signal propagates, an electrode directly connected to the line, and a terminal directly connected to the line or the electrode. In addition, a "transmission and reception path" means a transfer route that includes, for instance, a line through which a radio frequency transmission signal and a radio frequency reception signal propagate, an electrode directly connected to the line, and a terminal directly connected to the line or the electrode. Furthermore, as used herein the terms "circuit" or "circuitry" means one or more circuits, including discrete circuit(s) as well as circuit board(s) and combinations thereof.

BBIC 4 is a circuit that performs signal processing using the intermediate frequency band lower than the frequency band of a radio frequency signal propagated through radio frequency module 1. The signal processed by BBIC 4 is used as, for example, an image signal for image display, or an audio signal for reproduction by a loudspeaker.

RFIC 3 also functions as a controller that controls connections of switches 51, 52, and 53 included in radio frequency module 1 based on a communication band (frequency band) used. Specifically, RFIC 3 switches the connections of switches 51 to 53 included in radio frequency module 1 according to control signals (not illustrated). Note that the controller may be provided outside RFIC 3; for example in radio frequency module 1 or BBIC 4.

Antenna 2 is connected to antenna connection terminal 100 of radio frequency module 1, radiates a radio frequency signal output from radio frequency module 1, receives a radio frequency signal from outside, and outputs the received radio frequency signal to radio frequency module 1.

Note that in communication device 5 according to the present embodiment, antenna 2 and BBIC 4 are optional elements.

Next, a detailed configuration of radio frequency module 1 will be described.

As illustrated in FIG. 1, radio frequency module 1 includes transmission power amplifier 11, reception low noise amplifier 21, transmission filters 61T and 62T, reception filters 61R and 62R, switches 51, 52, and 53, antenna connection terminal 100, transmission input terminal 110, and reception output terminal 120.

Antenna connection terminal 100 is an example of an input-output terminal, and is connected to antenna 2.

Transmission power amplifier 11 is an amplifier that amplifies transmission signals of communication band A and communication band B. Transmission power amplifier 11 includes an input terminal connected to transmission input terminal 110, and an output terminal connected to switch 51. Note that an impedance matching circuit may be disposed between transmission power amplifier 11 and switch 51.

Reception low noise amplifier 21 is an amplifier that amplifies reception signals of communication band A and communication band B with low noise. Reception low noise amplifier 21 includes an output terminal connected to reception output terminal 120, and an input terminal connected to switch 52. Note that an impedance matching circuit may be disposed between reception low noise amplifier 21 and switch 52.

Transmission filter 61T is disposed on transmission path AT connecting a first selection terminal of switch 51 and a first selection terminal of switch 53. Among the transmission signals amplified by transmission power amplifier 11, transmission signals in the transmission range of communication band A pass through transmission filter 61T. Transmission filter 62T is disposed on transmission path BT connecting a second selection terminal of switch 51 and a second selection terminal of switch 53. Among the transmission signals amplified by transmission power amplifier 11, transmission signals in the transmission range of communication band B pass through transmission filter 62T.

Reception filter 61R is disposed on reception path AR connecting a first selection terminal of switch 52 and the first selection terminal of switch 53, Among reception signals input from antenna connection terminal 100, reception signals in the reception range of communication band A pass through reception filter 61R. Reception filter 62R is disposed on reception path BR connecting a second selection terminal of switch 52 and the second selection terminal of switch 53. Among reception signals input from antenna connection terminal 100, reception signals in the reception range of communication band B pass through reception filter 62R.

Transmission filter 61T and reception filter 61R constitute duplexer 61 having communication band A as the passband. Transmission filter 62T and reception filter 62R constitute duplexer 62 having communication band B as the passband.

In radio frequency module 1 according to the present embodiment, the transmission filter and the reception filter of each communication band constitute a duplexer that transfers a transmission signal and a reception signal by a frequency division duplex (FDD) method. Note that radio frequency module 1 may transfer a transmission signal and a reception signal by a time division duplex (TDD) method. In that case, a switch for switching between transmission and reception is disposed in at least one of the preceding stage and the subsequent stage of the transmission filter and the reception filter.

Note that each of transmission filters 61T and 62T and reception filters 61R and 62R described above may be, but not limited to, any of an acoustic wave filter that uses surface acoustic waves (SAWs), an acoustic wave filter that uses bulk acoustic waves (BAWs), an inductor-capacitor (LC) resonance filter, and a dielectric filter, for example.

Switch 51 is disposed between transmission power amplifier 11 and transmission filters 61T and 62T, and switches between connection of transmission power amplifier 11 and transmission filter 61T and connection of transmission power amplifier 11 and transmission filter 62T. Switch 51 is, for example, a single pole double throw (SPDT) switch circuit including: a common terminal connected to the output terminal of transmission power amplifier 11; the first selection terminal connected to transmission filter 61T; and the second selection terminal connected to transmission filter 62T.

Switch 52 is disposed between reception low noise amplifier 21 and reception filters 61R and 62R, and switches between connection of reception low noise amplifier 21 and reception filter 61R and connection of reception low noise amplifier 21 and reception filter 62R, Switch 52 is, for example, an SPDT switch circuit including: a common terminal connected to the input terminal of reception low noise amplifier 21; the first selection terminal connected to reception filter 61R; and the second selection terminal connected to reception filter 62R.

Switch 53 is an example of an antenna switch disposed between antenna connection terminal 100 and duplexers 61 and 62, Switch 53 switches between connection and disconnection of antenna connection terminal 100 and duplexer 61, and switches between connection and disconnection of antenna connection terminal 100 and duplexer 62, Note that switch 53 is a multiple-connection switch circuit capable of simultaneously establishing the connection of antenna connection terminal 100 and duplexer 61 and the connection of antenna connection terminal 100 and duplexer 62.

Note that an impedance matching circuit may be disposed between duplexer 61 and switch 53, and an impedance matching circuit may be disposed between duplexer 62 and switch 53.

Further, a multiplexer may be disposed between antenna connection terminal 100 and switch 53 to demultiplex and multiplex signals of a frequency range group including communication bands A and B and signals of another frequency range group.

Transmission power amplifier 11 and reception low noise amplifier 21 are each configured using, for example, a field effect transistor (FET) or a hetero-junction bipolar transistor (HBT) including, for instance, a Si-based complementary metal oxide semiconductor (CMOS) or GaAs.

Reception low noise amplifier 21 and switches 52 and 53 may be formed in a single semiconductor integrated circuit (IC). The semiconductor IC may further include transmission power amplifier 11 and switch 51, The semiconductor IC includes a CMOS, for example, and is specifically formed by the silicon on insulator (SOI) process. Accordingly, the semiconductor IC can be manufactured at low cost. Note that the semiconductor IC may include at least one of GaAs, SiGe, or GaN. Accordingly, a radio frequency signal having high quality of amplification and noise properties can be output.

In the configuration of radio frequency module 1 described above, transmission power amplifier 11, switch 51, transmission filter 61T, and switch 53 are included in a first transmitter circuit that receives transmission signals of communication band A via transmission input terminal 110, and outputs the transmission signals to antenna connection terminal 100. Transmission power amplifier 11, switch 51, transmission filter 62T, and switch 53 are included in a second transmitter circuit that receives transmission signals of communication band B via transmission input terminal 110, and outputs the transmission signals to antenna connection terminal 100. Reception low noise amplifier 21, switch 52, reception filter 61R, and switch 53 are included in a first receiver circuit that receives reception signals of communication band A from antenna 2 via antenna connection terminal 100, and outputs the reception signals via reception output terminal 120, Reception low noise amplifier 21, switch 52, reception filter 62R, and switch 53 are included in a second receiver circuit that receives reception signals of communication band B from antenna 2 via antenna connection terminal 100, and outputs the reception signals via reception output terminal 120.

According to the above circuit configuration, radio frequency module 1 according to the present embodiment can perform at least one of transmission, reception, or transfer of a radio frequency signal of communication band A or a radio frequency signal of communication band B. In addition, radio frequency module 1 can perform at least one of simultaneous transmission, simultaneous reception, or simultaneous transfer of both a radio frequency signal of communication band A and a radio frequency signal of communication band B.

Note that in the radio frequency module according to the present disclosure, the transmitter circuits and the receiver circuits need not be connected to antenna connection terminal 100 via switch 53, and may be connected to antenna 2 via different terminals. Furthermore, it is sufficient if the radio frequency module according to the present disclosure includes at least reception low noise amplifier 21 among the circuit elements included in the transmitter circuits and the receiver circuits described above.

Here, in the case of a radio frequency module in which a semiconductor IC that includes a reception low noise amplifier and peripheral circuit components are mounted on a module board at high density, there is a concern that radio frequency noise from the semiconductor IC and digital noise for controlling the semiconductor IC may flow into the peripheral circuit components, and noise from the peripheral circuit components may flow into the semiconductor IC.

To address this, in radio frequency module 1 according to the present embodiment, electromagnetic shielding performance of the semiconductor IC is strengthened to reduce the impacts of the above-described radio frequency noise and digital noise. The following describes a configuration in which electromagnetic shielding performance of radio frequency module 1 according to the present embodiment is strengthened.

[2. Arrangement of Circuit Elements of Radio Frequency Module 1A According to a Working Example]

Figure 2A:
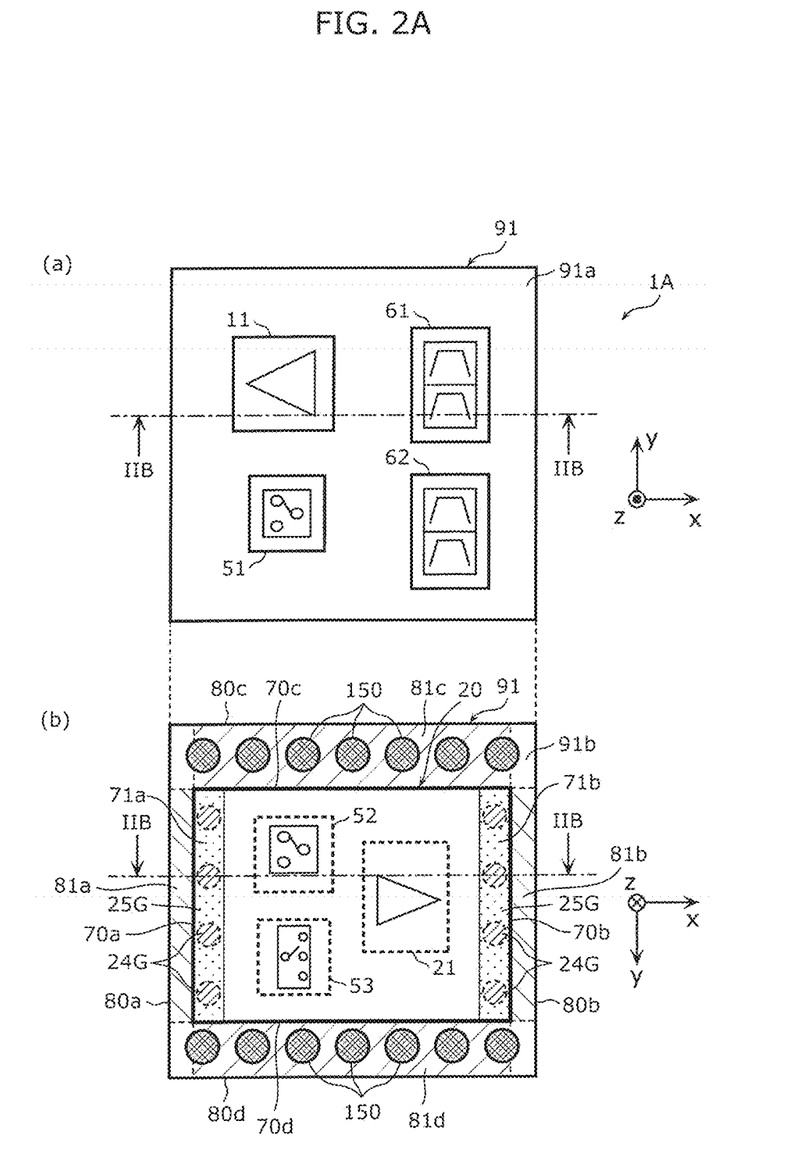
FIG. 2A is a schematic diagram illustrating a plan view configuration of a radio frequency module according to a working example.
Figure 2B:
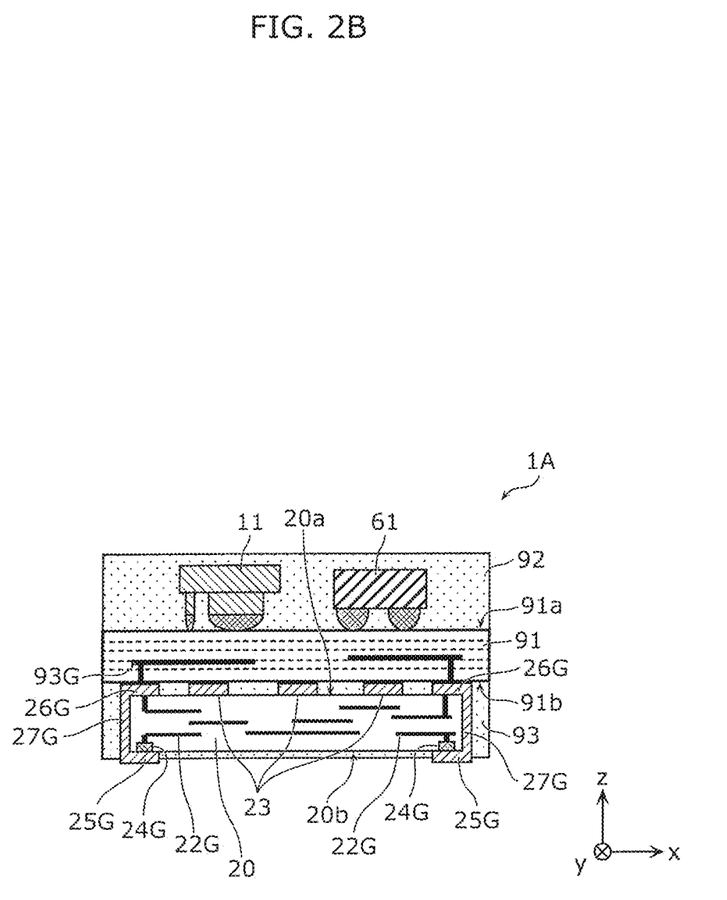
FIG. 2B is a schematic diagram illustrating a cross-sectional configuration of the radio frequency module according to the working example.

FIG. 2A is a schematic diagram illustrating a plan view configuration of radio frequency module 1A according to a working example. FIG. 2B is a schematic diagram illustrating a cross-sectional configuration of radio frequency module 1A according to the working example, and is specifically a cross-sectional view taken at line IIB-IIB in FIG. 2A. Note that part (a) of FIG. 2A illustrates an arrangement of circuit elements when resin component 92 is seen through from the z-axis positive side of principal surface 91a among principal surfaces 91a and 91b that are located on opposite sides of module board 91. Part (b) of FIG. 2A illustrates an arrangement of circuit elements when resin component 93 is seen through from the z-axis negative side of principal surface 91b.

Radio frequency module 1A according to the working example is to specifically show an arrangement of circuit elements included in radio frequency module 1 according to the embodiment.

As illustrated in FIG. 2A and FIG. 2B, radio frequency module 1A according to the present working example includes module board 91, resin components 92 and 93, and external-connection terminals 150 in addition to the circuit elements illustrated in FIG. 1.

Module board 91 includes principal surface 91a (a first principal surface) and principal surface 91b (a second principal surface) on opposite sides of module board 91, and is a board on which the circuit elements included in the first transmitter circuit, the second transmitter circuit, the first receiver circuit, and the second receiver circuit are mounted. Examples of the board used for module board 91 include a low temperature co-fired ceramics (LTCC) board having a configuration in which a plurality of dielectric layers are stacked, a high temperature co-fired ceramics (HTCC) board, a component-embedded board, a board having a redistribution layer (RDL), and a printed circuit board, Note that antenna connection terminal 100, transmission input terminal 110, and reception output terminal 120 may be formed on module board 91.

Resin component 92 is disposed on principal surface 91a of module board 91, and covers principal surface 91a of module board 91 and part of the circuit elements included in the first and second transmitter circuits and the first and second receiver circuits. Resin component 92 has a function to ensure the reliability of these circuit elements, such as the mechanical strength and moisture resistance. Resin component 93 is disposed on principal surface 91b of module board 91, and covers principal surface 91b of module board 91 and part of the circuit elements included in the first and second transmitter circuits and the first and second receiver circuits. Resin component 93 has a function to ensure the reliability of these circuit elements, such as the mechanical strength and moisture resistance. Note that resin components 92 and 93 are optional elements of the radio frequency module according to the present disclosure.

External-connection terminals 150 are disposed on principal surface 91b, Radio frequency module 1A transmits and receives, via a plurality of external-connection terminals 150, electric signals to and from a motherboard that is disposed on the z-axis negative side of radio frequency module 1A. Some of external-connection terminals 150 are set to the ground potential of the motherboard.

Of principal surfaces 91a and 91b, semiconductor IC 20 including reception low noise amplifier 21 and switches 52 and 53 that can be readily reduced in profile is disposed on principal surface 91b facing the motherboard, Therefore, radio frequency module 1A can be reduced in profile as a whole. Moreover, since a plurality of external-connection terminals 150 used as ground electrodes are disposed in the outer peripheral region of reception low noise amplifiers 21 having a significant impact on the reception sensitivity of the receiver circuits, it is possible to reduce deterioration of the reception sensitivity of the receiver circuits.

Note that external-connection terminals 150 may be columnar electrodes penetrating through resin component 93 in the z-axis direction, or may be bump electrodes formed on principal surface 91b.

Semiconductor IC 20 is an example of a semiconductor IC that includes principal surface 20a (a third principal surface) and principal surface 20b (a fourth principal surface) on opposite sides of the semiconductor IC. In the present working example, semiconductor IC 20 includes reception low noise amplifier 21 and switches 52 and 53. Semiconductor IC 20 is disposed on principal surface 91b so that principal surface 20a faces principal surface 91b and is closer to principal surface 91b than principal surface 20b is. That is to say, principal surface 20a faces principal surface 91b, and principal surface 20b faces the motherboard. Note that semiconductor IC 20 need not include switches 52 and 53.

Semiconductor IC 20 also includes signal electrodes 23 formed on principal surface 20a and ground electrodes 26G (second ground electrodes) formed on principal surface 20a. Semiconductor IC 20 transmits and receives electric signals to and from other circuit elements via signal electrodes 23 and electrodes and lines formed on module board 91. Ground electrodes 26G are connected to ground planar lines 22G provided in semiconductor IC 20.

Semiconductor IC 20 further includes ground electrodes 25G (first ground electrodes) formed on principal surface 20b, and lateral surface electrodes 27G formed on the lateral surfaces of semiconductor IC 20. Ground electrodes 25G are connected to ground planar lines 22G provided in semiconductor IC 20, through via conductors and via electrodes 24G. Note that via electrodes 24G are optional.

With the above electrode configuration of semiconductor IC 20, not only ground electrodes 26G are formed on principal surface 20a, but ground electrodes 25G are also formed on principal surface 20b facing the motherboard, and thus, the ground of semiconductor IC 20 can be strengthened.

Furthermore, in the present working example, lateral surface electrodes 27G connect ground electrodes 25G and ground electrodes 26G. This makes it possible to strengthen the ground of the outer peripheral portion of semiconductor IC 20, and therefore, radio frequency noise from semiconductor IC 20 and digital noise for controlling semiconductor IC 20 can be inhibited from flowing into peripheral circuit components, and noise from the peripheral circuit components can be inhibited from flowing into semiconductor IC 20. As a result, the electromagnetic shielding performance of semiconductor IC 20 can be strengthened.

As illustrated in part (b) of FIG. 2A, in radio frequency module 1A according to the present working example, principal surface 20b is quadrilateral in a plan view of principal surface 20b. Two ground electrodes 25G are formed on principal surface 20b. One of two ground electrodes 25G is formed in edge region 71a (a first edge region) that includes edge 70a (a first edge) among edges 70a, 70b, 70c, and 70d of principal surface 20b. The other of two ground electrodes 25G is formed in edge region 71b (a second edge region) that includes edge 70b (a second edge) facing edge 70a (the first edge) among edges 70a, 70b, 70c, and 70d of principal surface 20b.

With this, since ground electrodes 25G are disposed in edge regions 71a and 71b facing each other on principal surface 20b of semiconductor IC 20, radio frequency noise from semiconductor IC 20 and digital noise for controlling semiconductor IC 20 can be inhibited from flowing into peripheral circuit components from edges 70a and 70b, and noise from the peripheral circuit components can be inhibited from flowing into semiconductor IC 20 from edges 70a and 70b, As a result, the electromagnetic shielding performance of semiconductor IC 20 can be strengthened.

In addition, with the electrode configuration of semiconductor IC 20 according to the present working example, since ground electrodes 25G are formed in the edge regions of semiconductor IC 20, it is possible to reduce the number of external-connection terminals 150 disposed in edge regions of module board 91 adjacent to the edge regions of semiconductor IC 20 in which ground electrodes 25G are formed.

That is to say, as illustrated in part (b) of FIG. 2A, principal surface 91b is quadrilateral in a plan view of principal surface 91b. A plurality of external-connection terminals 150 are formed on principal surface 91b. External-connection terminals 150 are not formed in (i) edge region 81a (a third edge region) of principal surface 91b located between edge 70a and edge 80a (a third edge) that is included in a plurality of edges 80a, 80b, 80c, and 80d of principal surface 91b and is most closely facing edge 70a, nor (ii) edge region 81b (a fourth edge region) of principal surface 91b located between edge 70b and edge 80b (a fourth edge) that is included in the plurality of edges 80a, 80b, 80c, and 80d and is most closely facing edge 70b, On the other hand, external-connection terminals 150 are formed in the edge regions on principal surface 91b other than edge regions 81a and 81b.

Figure 2C:
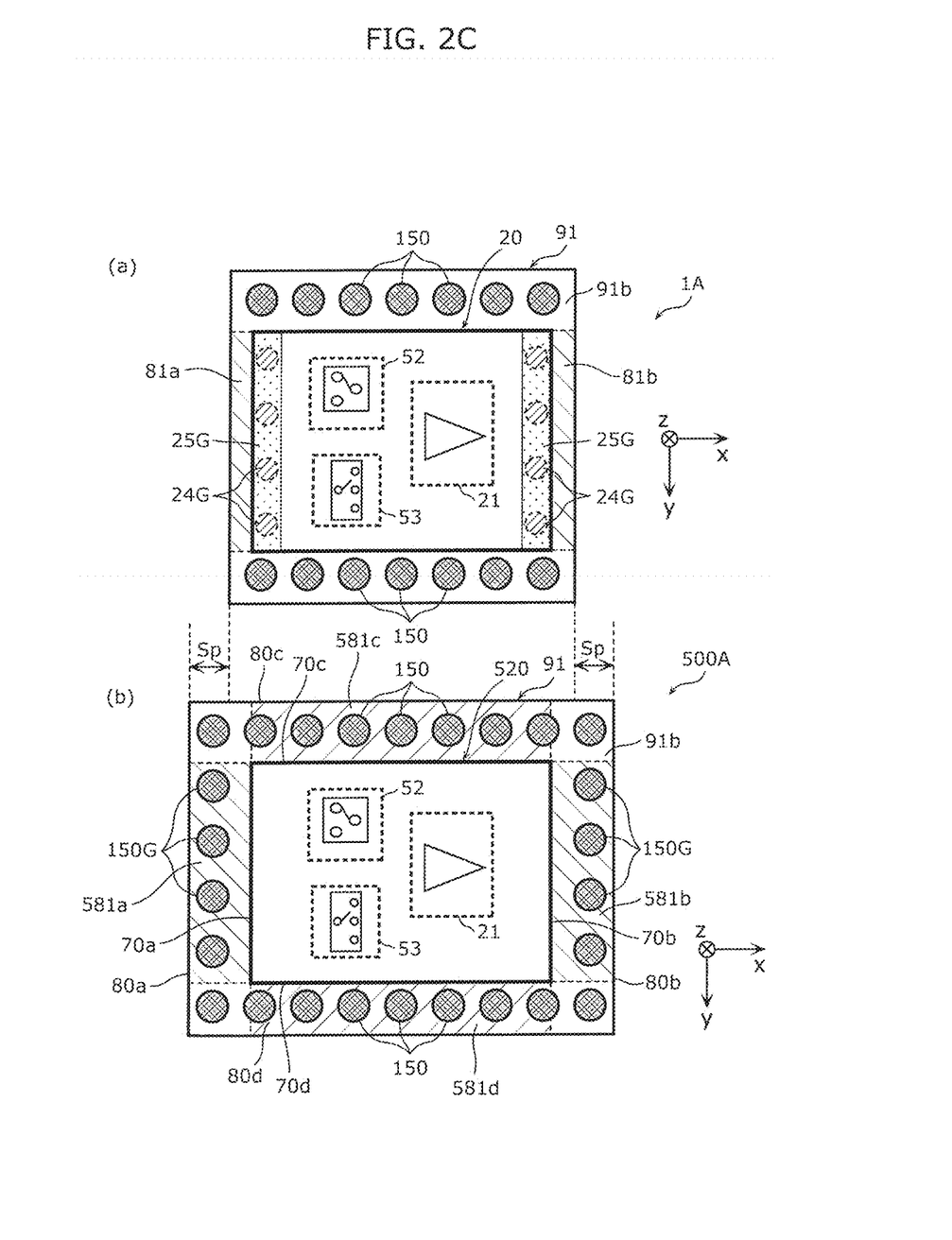
FIG. 2C illustrates a comparison of plan view configurations of radio frequency modifies according to the working example and a comparative example.

FIG. 2C illustrates a comparison of plan view configurations of radio frequency modules according to the working example and a comparative example. Part (a) of the figure illustrates an arrangement of circuit elements when resin component 93 is seen through from the z-axis negative side of principal surface 91b of radio frequency module 1A according to the working example, whereas part (b) of the figure illustrates an arrangement of circuit elements when resin component 93 is seen through from the z-axis negative side of principal surface 91b of radio frequency module 500A according to the comparative example.

Note that radio frequency module 500A according to the comparative example is the same as radio frequency module 1A according to the working example in circuit element configuration, but different in (i) electrode configuration of semiconductor IC 520 and (ii) that external-connection terminals 150G are disposed on principal surface 91b.

Semiconductor IC 520 included in radio frequency module 500A is an example of a semiconductor IC that includes principal surfaces 520a and 520b on opposite sides of the semiconductor IC. In this comparative example, semiconductor IC 520 includes reception low noise amplifier 21 and switches 52 and 53. Semiconductor IC 520 is disposed on principal surface 91b so that principal surface 520a faces principal surface 91b and is closer to principal surface 91b than principal surface 520b is, That is to say, principal surface 520a faces principal surface 91b, and principal surface 520b faces the motherboard.

As for semiconductor IC 520, no ground electrodes are formed on principal surface 520b. That is to say, with semiconductor IC 520, since no ground electrodes are formed on principal surface 520b facing the motherboard, the ground of semiconductor IC 520 cannot be strengthened.

Thus, with radio frequency module 500A according to the comparative example, external-connection terminals 150G that are set to the ground potential are formed in (i) edge region 581a of principal surface 91b located between edge 70a of semiconductor IC 520 and edge 80a of module board 91, and (ii) edge region 581b of principal surface 91b located between edge 70b and edge 80b of module board 91, With external-connection terminals 150G, radio frequency noise from semiconductor IC 520 and digital noise for controlling semiconductor IC 520 are inhibited from flowing into peripheral circuit components from edges 70a and 70b, and noise from the peripheral circuit components is inhibited from flowing into semiconductor IC 520 from edges 70a and 70b.

Radio frequency module 500A according to the comparative example, however, becomes larger in size than radio frequency module 1A according to the working example by edge regions 581a and 581b in which external-connection terminals 150G are disposed (Sp shown in part (b) of FIG. 2C).

In contrast, with radio frequency module 1A according to the working example, it is possible to reduce the size while strengthening the electromagnetic shielding performance of semiconductor IC 20 that includes reception low noise amplifier 21.

Note that the shape of principal surface 20b of semiconductor IC 20 and the shape of principal surface 91b of module board 91 are not limited to quadrilateral, and may be polygonal. In addition, the corners of principal surfaces 20b and 91b may be chamfered or may have round shapes.

In radio frequency module 1A according to the present working example, transmission power amplifier 11 is mounted on principal surface 91a.

That is to say, transmission power amplifier 11 and reception low noise amplifier 21 are disposed with module board 91 interposed therebetween. This makes it possible to reduce electric-field coupling, magnetic coupling, or electromagnetic coupling between transmission power amplifier 11 and reception low noise amplifier 21 which occurs when a high-power transmission signal output from transmission power amplifier 11 is transferred via transmission path AT or BT. Therefore, a transmission signal of communication band A or B can be inhibited from flowing into reception path AR or BR without passing through transmission filter 61T or 62T or switch 53, Accordingly, since isolation between the transmitter circuits and the receiver circuits improves, it is possible to reduce deterioration of reception sensitivity caused by a flow of the transmission signal, a harmonic, and spurious waves of intermodulation distortion into reception path AR or BR.

Note that, as illustrated in FIG. 2B, module board 91 desirably has a multi-layer structure in which a plurality of dielectric layers are stacked, and at least one of the dielectric layers desirably has ground electrode pattern 93G formed therein. This enhances the electromagnetic-field shielding function of module board 91.

Among the circuit components included in radio frequency module 1A, transmission power amplifier 11 is a component that generates a large amount of heat. To enhance the heat dissipating properties of radio frequency module 1A, it is important to dissipate heat generated by transmission power amplifier 11 to the motherboard via a heat dissipation path having small thermal resistance. If transmission power amplifier 11 is mounted on principal surface 91b, an electrode line connected to transmission power amplifier 11 is disposed on principal surface 91b. Thus, the heat dissipation path in such a case includes a heat dissipation path passing only through a planar line pattern on principal surface 91b (along the xy plane direction). Since this planar line pattern is formed with a thin metal film, the thermal resistance is large. Consequently, the heat dissipating properties deteriorate if transmission power amplifier 11 is disposed on principal surface 91b.

In contrast, when transmission power amplifier 11 is mounted on principal surface 91a, transmission power amplifier 11 and external-connection terminals 150 can be connected via a penetrating electrode that penetrates through module board 91 between principal surfaces 91a and 91b. Thus, the heat dissipation path of transmission power amplifier 11 can exclude a heat dissipation path that passes only through a planar line pattern having large thermal resistance and formed along the xy plane direction among the lines in module board 91, Accordingly, it is possible to provide small-sized radio frequency module 1A having enhanced heat dissipating properties for dissipating heat from transmission power amplifier 11 to the motherboard.

Figure 2D:
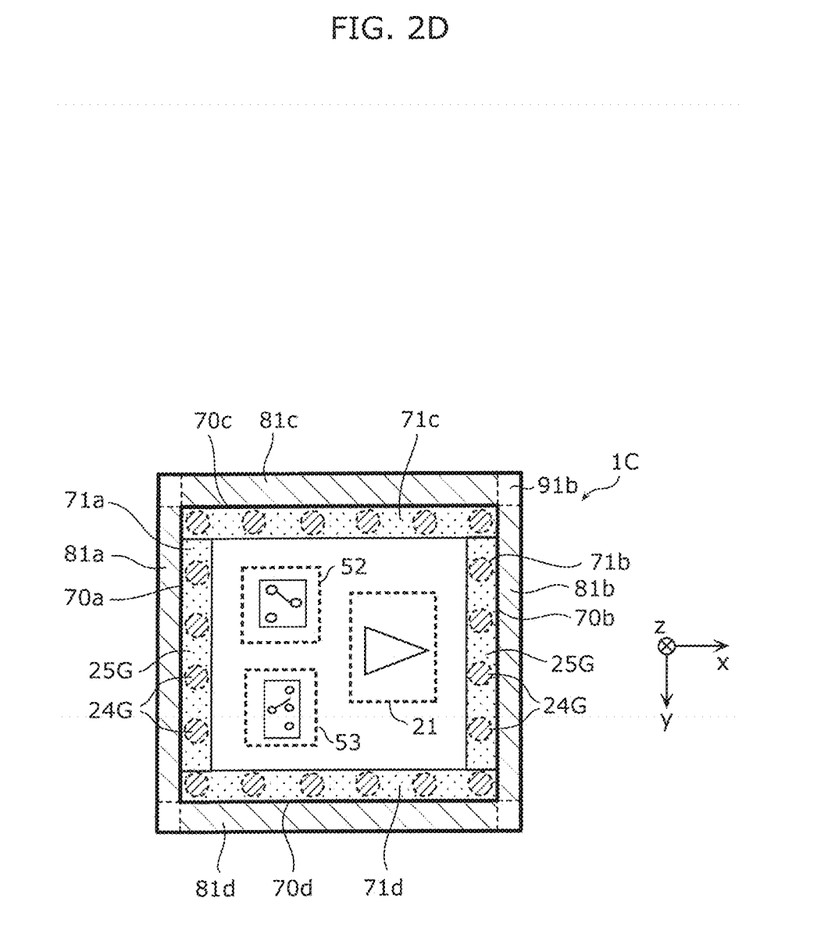
FIG. 2D is a schematic diagram illustrating a plan view configuration of a radio frequency module according to Variation 1.

FIG. 2D is a schematic diagram illustrating a plan view configuration of radio frequency module 1C according to Variation 1, FIG. 2D illustrates an arrangement of circuit elements when resin component 93 is seen through from the z-axis negative side of principal surface 91b. Radio frequency module 1C according to the present variation is different from radio frequency module 1A according to the working example in arrangement of ground electrodes 25G. Hereinafter, radio frequency module 1C according to the present variation will be described, focusing on the configuration different from radio frequency module 1A according to the working example and omitting the description of the configuration identical to radio frequency module 1A.

As illustrated in FIG. 2D, in radio frequency module 1C according to the present variation, principal surface 20b is quadrilateral in a plan view of principal surface 20b. Four ground electrodes 25G are formed on principal surface 20b. Four ground electrodes 25G are respectively formed in edge region 71a that includes edge 70a of principal surface 20b, edge region 71b that includes edge 70b of principal surface 20b, edge region 71c that includes edge 70c of principal surface 20b, and edge region 71d that includes edge 70d of principal surface 20b.

With this, since ground electrodes 25G are disposed in edge regions 71a, 71b, 71c, and 71d on principal surface 20b of semiconductor IC 20, radio frequency noise from semiconductor IC 20 and digital noise for controlling semiconductor IC 20 can be inhibited from flowing into peripheral circuit components from edges 70a, 70b, 70c, and 70d, and noise from the peripheral circuit components can be inhibited from flowing into semiconductor IC 20 from edges 70a, 70b, 70c, and 70d. As a result, the electromagnetic shielding performance of semiconductor IC 20 can be strengthened.

[3. Arrangement of Circuit Elements of Radio Frequency Module 1B According to Variation 2]

Figure 3A:
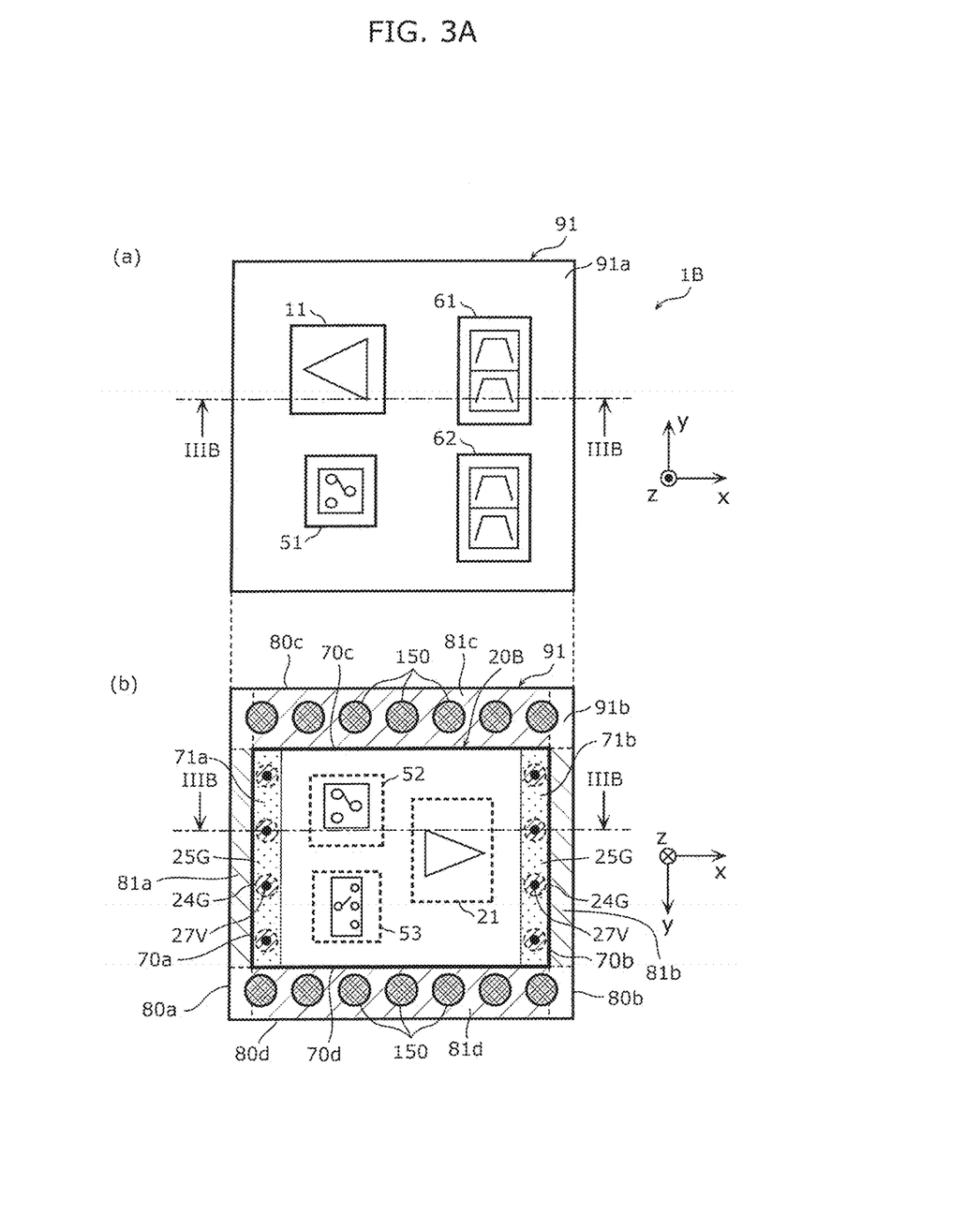
FIG. 3A is a schematic diagram illustrating a plan view configuration of a radio frequency module according to Variation 2.
Figure 3B:
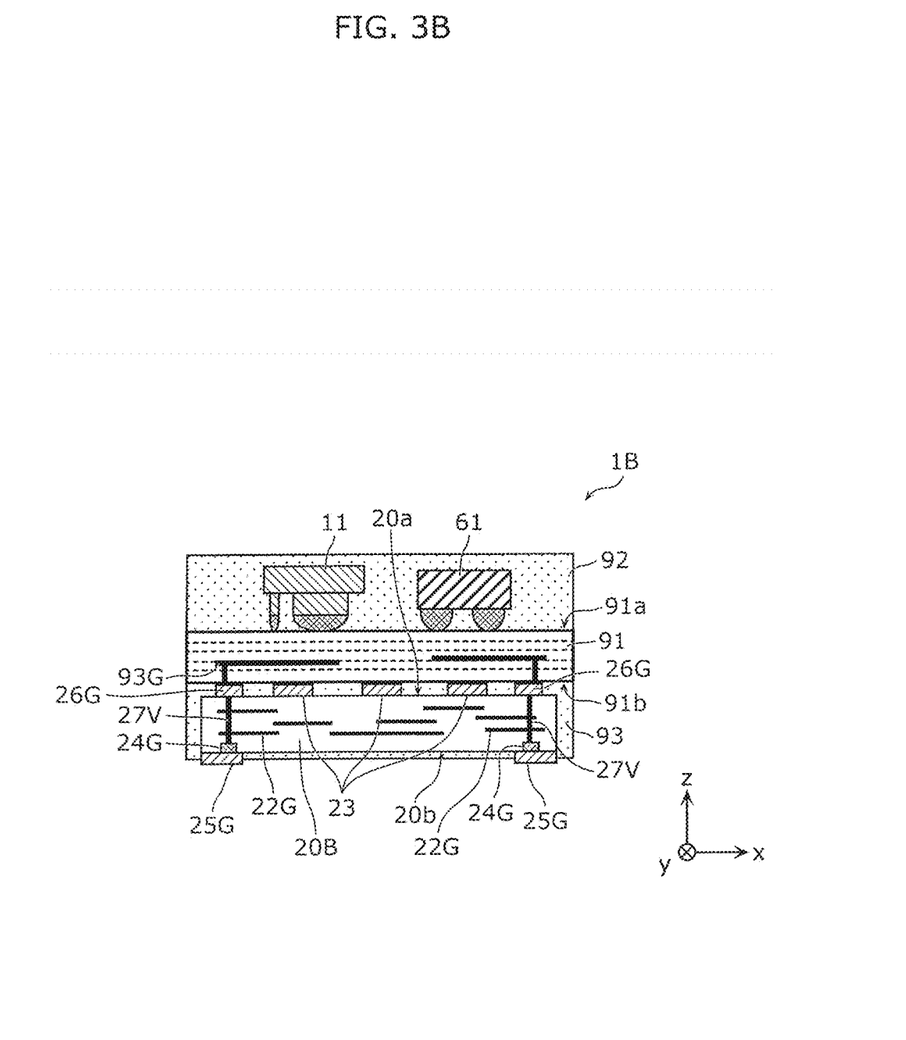
FIG. 3B is a schematic diagram illustrating a cross-sectional configuration of a radio frequency module according to Variation 2.

FIG. 3A is a schematic diagram illustrating a plan view configuration of radio frequency module 1B according to Variation 2. FIG. 3B is a schematic diagram illustrating a cross-sectional configuration of radio frequency module 1B according to Variation 2, and is specifically a cross-sectional view taken at line IIIB-IIIB in FIG. 3A. Note that part (a) of FIG. 3A illustrates an arrangement of circuit elements when resin component 92 is seen through from the z-axis positive side of principal surface 91a among principal surfaces 91a and 91b that are located on opposite sides of module board 91. Part (b) of FIG. 3A illustrates an arrangement of circuit elements when resin component 93 is seen through from the z-axis negative side of principal surface 91b.

Radio frequency module 1B according to Variation 2 is to specifically show an arrangement of circuit elements included in radio frequency module 1 according to the embodiment.

As illustrated in FIG. 3A and FIG. 33, radio frequency module 13 according to the present variation includes module board 91, resin components 92 and 93, and external-connection terminals 150 in addition to the circuit elements illustrated in FIG. 1.

Radio frequency module 1B according to the present variation is different from radio frequency module 1A according to the working example in ground electrode configuration of semiconductor IC 20B. Hereinafter, radio frequency module 1B according to the present variation will be described, focusing on the aspects different from radio frequency module 1A according to the working example and omitting the description of the aspects identical to radio frequency module 1A.

Semiconductor IC 203 is an example of a semiconductor IC that includes principal surface 20a (a third principal surface) and principal surface 20b (a fourth principal surface) on opposite sides of the semiconductor IC. In the present variation, semiconductor IC 203 includes reception low noise amplifier 21 and switches 52 and 53. Semiconductor IC 203 is disposed on principal surface 91b so that principal surface 20a faces principal surface 91b and is closer to principal surface 91b than principal surface 20b is, That is to say, principal surface 20a faces principal surface 91b, and principal surface 20b faces the motherboard. Note that semiconductor IC 203 need not include switches 52 and 53.

Semiconductor IC 203 also includes signal electrodes 23 formed on principal surface 20a and ground electrodes 26G (second ground electrodes) formed on principal surface 20a. Semiconductor IC 20B transmits and receives electric signals to and from other circuit elements via signal electrode 23 and electrodes and lines formed on module board 91. Ground electrodes 26G are connected to ground planar lines 22G provided in semiconductor IC 208.

Semiconductor IC 203 further includes ground electrodes 25G (first ground electrodes) formed on principal surface 20b and via conductors 27V formed in semiconductor IC 20. Via conductors 27V extend in the direction perpendicular to principal surfaces 20a and 20b (the z-axis direction), and connect ground electrodes 25G and ground electrodes 26G. Ground electrodes 25G are connected to via conductors 27V through via electrodes 24G. Ground electrodes 26G are connected to ground planar lines 22G provided in semiconductor IC 203. Note that via electrodes 24G are optional.

With the above electrode configuration of semiconductor IC 203, not only ground electrodes 26G are formed on principal surface 20a, but ground electrodes 25G are also formed on principal surface 20b facing the motherboard, and thus, the ground of semiconductor IC 203 can be strengthened.

Furthermore, in the present variation, via conductors 27V connect ground electrodes 25G and ground electrodes 26G. This makes it possible to strengthen the ground of semiconductor IC 20B, and therefore, radio frequency noise from semiconductor IC 203 and digital noise for controlling semiconductor IC 203 can be inhibited from flowing into peripheral circuit components, and noise from the peripheral circuit components can be inhibited from flowing into semiconductor IC 203. As a result, the electromagnetic shielding performance of semiconductor IC 20B can be strengthened.

As illustrated in part (b) of FIG. 3A, in radio frequency module 13 according to the present variation, principal surface 20b is quadrilateral in a plan view of principal surface 20b. Two ground electrodes 25G are formed on principal surface 20b, One of two ground electrodes 25G is formed in edge region 71a (a first edge region) that includes edge 70a (a first edge). The other of two ground electrodes 25G is formed in edge region 71b (a second edge region) that includes edge 70b (a second edge) facing edge 70a (the first edge).

With this, since ground electrodes 25G are disposed in edge regions 71a and 71b that face each other on principal surface 20b of semiconductor IC 20B, radio frequency noise from semiconductor IC 20B and digital noise for controlling semiconductor IC 20B can be inhibited from flowing into peripheral circuit components from edges 70a and 70b, and noise from the peripheral circuit components can be inhibited from flowing into semiconductor IC 203 from edges 70a and 70b.

In addition, with the electrode configuration of semiconductor IC 203 according to the present working example, since ground electrodes 25G are formed in the edge regions of semiconductor IC 203, it is possible to reduce the number of external-connection terminals 150 disposed in edge regions of module board 91 adjacent to the edge regions of semiconductor IC 20B in which ground electrodes 25G are formed.

Figure 3C:
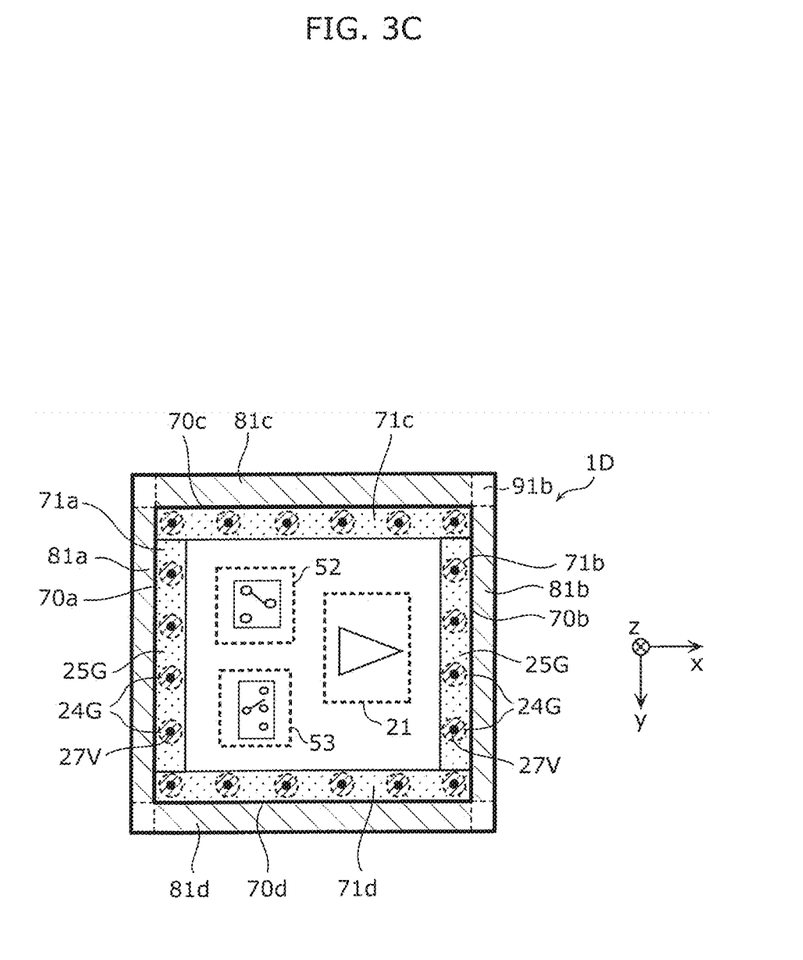
FIG. 3C is a schematic diagram illustrating a plan view configuration of a radio frequency module according to Variation 3.

As a result, radio frequency module 13 according to the present working example makes it possible to reduce the size while strengthening the electromagnetic shielding performance of semiconductor IC 203 that includes reception low noise amplifier 21, FIG. 3C is a schematic diagram illustrating a plan view configuration of radio frequency module 1D according to Variation 3. FIG. 3C illustrates arrangement of circuit elements when resin component 93 is seen through from the z-axis negative side of principal surface 91b. Radio frequency module 1D according to the present variation is different from radio frequency module 13 according to Variation 2 in arrangement of ground electrodes 25G, Hereinafter, radio frequency module 1D according to the present variation will be described, focusing on the configuration different from radio frequency module 13 according to Variation 2 and omitting the description of the configuration identical to radio frequency module 13.

As illustrated in FIG. 3C, in radio frequency module 1D according to the present variation, principal surface 20b is quadrilateral in a plan view of principal surface 20b. Four ground electrodes 25G are formed on principal surface 20b. Four ground electrodes 25G are respectively formed in edge region 71a that includes edge 70a of principal surface 20b, edge region 71b that includes edge 70b of principal surface 20b, edge region 71c that includes edge 70c of principal surface 20b, and edge region 71d that includes edge 70d of principal surface 20b.

With this, since ground electrodes 25G are disposed in edge regions 71a, 71b, 71c, and 71d on principal surface 20b of semiconductor IC 20, radio frequency noise from semiconductor IC 20 and digital noise for controlling semiconductor IC 20 can be inhibited from flowing into peripheral circuit components from edges 70a, 70b, 70c, and 70d, and noise from the peripheral circuit components can be inhibited from flowing into semiconductor IC 20 from edges 70a, 70b, 70c, and 70d. As a result, the electromagnetic shielding performance of semiconductor IC 20 can be strengthened.

[4. Advantageous Effects Etc.]

Radio frequency module 1 according to the present embodiment includes: module board 91 including principal surface 91a and principal surface 91b on opposite sides of module board 91; semiconductor IC 20 on principal surface 91b; and external-connection terminal 150 on principal surface 91b. In radio frequency module 1, semiconductor IC 20 includes principal surface 20a and principal surface 20b on opposite sides of semiconductor IC 20. Here, principal surface 20a faces principal surface 91b, and is closer to principal surface 91b than principal surface 20b is. Semiconductor IC 20 includes: reception low noise amplifier 21; and ground electrode 25G on principal surface 20b.

With this, since ground electrodes 25G are formed on principal surface 20b facing the motherboard, the ground of semiconductor IC 20 can be strengthened. As a result, the electromagnetic shielding performance of semiconductor IC 20 can be strengthened.

Semiconductor IC 20B according to Variation 2 may further include: ground electrode 26G on principal surface 20a; and via conductor 27V in semiconductor IC 20B, via conductor 27V being connected to ground electrodes 25G and 26G.

This makes it possible to further strengthen the ground of semiconductor IC 20B, and therefore, radio frequency noise from semiconductor IC 20B and digital noise for controlling semiconductor IC 20B can be inhibited from flowing into peripheral circuit components, and noise from the peripheral circuit components can be inhibited from flowing into semiconductor IC 20B. As a result, the electromagnetic shielding performance of semiconductor IC 20B can be further strengthened.

Semiconductor IC 20 according to the working example may further include: ground electrode 26G on principal surface 20a; and lateral surface electrode 27G on a lateral surface of semiconductor IC 20, lateral surface electrode 27G being connected to ground electrodes 25G and 26G.

This makes it possible to further strengthen the ground of the outer peripheral portion of semiconductor IC 20, and therefore, radio frequency noise from semiconductor IC 20 and digital noise for controlling semiconductor IC 20 can be inhibited from flowing into peripheral circuit components, and noise from the peripheral circuit components can be inhibited from flowing into semiconductor IC 20. As a result, the electromagnetic shielding performance of semiconductor IC 20 can be further strengthened.

In radio frequency module 1 according to the present embodiment, in a plan view of principal surface 20b, principal surface 20b may be polygonal, a plurality of ground electrodes 25G may be on principal surface 20b, one ground electrode 25G among the plurality of ground electrodes 25G may be in edge region 71a that includes edge 70a among a plurality of edges of principal surface 20b, and another ground electrode 25G among the plurality of ground electrodes 25G may be in edge region 71b that includes edge 70b facing edge 70a among the plurality of edges of principal surface 20b.

With this, since ground electrodes 25G are disposed in edge regions 71a and 71b facing each other on principal surface 20b of semiconductor IC 20, radio frequency noise from semiconductor IC 20 and digital noise for controlling semiconductor IC 20 can be inhibited from flowing into peripheral circuit components from edges 70a and 70b, and noise from the peripheral circuit components can be inhibited from flowing into semiconductor IC 20 from edges 70a and 70b, As a result, the electromagnetic shielding performance of semiconductor IC 20 can be strengthened.

In a plan view of principal surface 91b, module board 91 may be polygonal, a plurality of external-connection terminals 150 may be on principal surface 91b, the plurality of external-connection terminals 150 may not be in (i) edge region 81a of module board 91 located between edge 70a and edge 80a that is included in a plurality of edges of principal surface 91b and is most closely facing edge 70a, nor (ii) edge region 81b of module board 91 located between edge 70b and edge 80b that is included in the plurality of edges of principal surface 91b and is most closely facing edge 70b, and the plurality of external-connection terminals 150 may be in an edge region on module board 91 other than edge regions 81a and 81b.

This makes it possible to reduce the size of radio frequency module 1 while strengthening the electromagnetic shielding performance of semiconductor IC 20.

Radio frequency module 1 may further include transmission power amplifier 11 on principal surface 91a.

With this, transmission power amplifier 11 and reception low noise amplifier 21 are disposed with module board 91 interposed therebetween. Since this improves isolation between the transmitter circuits and the receiver circuits, it is possible to reduce deterioration of reception sensitivity. It is also possible to enhance the heat dissipating properties for dissipating heat from transmission power amplifier 11 to the motherboard.

Radio frequency module 1 may further include: reception filter 61R having communication band A as a passband; reception filter 62R having communication band B as a passband; switch 52 configured to switch between connection of reception low noise amplifier 21 and reception filter 61R and connection of reception low noise amplifier 21 and reception filter 62R; and switch 53 configured to switch connection and disconnection of antenna connection terminal 100 and reception filter 61R, and switch connection and disconnection of antenna connection terminal 100 and reception filter 62R. Here, switches 52 and 53 may be included in semiconductor IC 20, and reception filters 61R and 62R may be on principal surface 91a.

With this, of principal surfaces 91a and 91b, semiconductor IC 20 including reception low noise amplifier 21 and switches 52 and 53 that can be readily reduced in profile is disposed on principal surface 91b facing the motherboard. Therefore, radio frequency module 1 can be reduced in profile as a whole.

Communication device 5 includes: RFIC 3 configured to process a radio frequency signal which is to be transmitted by antenna 2 and a radio frequency signal which has been received by antenna 2; and radio frequency module 1 configured to transfer the radio frequency signals between antenna 2 and RFIC 3.

This makes it possible to provide small-sized communication device 5 in which electromagnetic shielding performance of semiconductor IC 20 including a radio frequency active element is strengthened.

Other Embodiments, Etc.

Although a radio frequency module and a communication device according to an embodiment of the present disclosure have been described based on a working example and variations, the radio frequency module and the communication device according to the present disclosure are not limited to the above working example and variations. The present disclosure also encompasses other embodiments implemented by arbitrarily combining constituent elements in the above working example and variations, as well as variations resulting from various modifications to the above working example and variations that are conceivable to a person skilled in the art without departing from the essence of the present disclosure, and various apparatuses that include the above radio frequency module and communication device.

For example, in the radio frequency module and the communication device according to the above working example and variations, circuit elements and lines, for instance, may be interposed between circuit elements and paths that connect signal paths illustrated in the drawings.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable to communication apparatuses such as mobile phones, as a radio frequency module disposed in a multiband-compatible front-end unit.

The invention claimed is:

1. A radio frequency module, comprising:
    a module board including a first principal surface and a second principal surface on opposite sides of the module board, the module board being connected to a motherboard;
    a semiconductor integrated circuit (IC) on the second principal surface; and
    an external-connection terminal on the second principal surface,
    wherein the semiconductor IC includes a third principal surface and a fourth principal surface on opposite sides of the semiconductor IC,
    the third principal surface faces the second principal surface, and is closer to the second principal surface than the fourth principal surface, and
    the semiconductor IC includes
        a reception low noise amplifier, and
        a first ground electrode on the fourth principal surface,
    wherein the external-connection terminal is connected to the motherboard and the first ground electrode is also connected to the motherboard.

2. The radio frequency module according to claim 1, wherein the semiconductor IC further includes:
    a second ground electrode on the third principal surface; and
    a via conductor in the semiconductor IC, the via conductor being connected to the first ground electrode and the second ground electrode.

3. The radio frequency module according to claim 1, wherein the semiconductor IC further includes:
    a second ground electrode on the third principal surface; and
    a lateral surface electrode on a lateral surface of the semiconductor IC, the lateral surface electrode being connected to the first ground electrode and the second ground electrode.

4. The radio frequency module according to claim 1, further comprising:
a transmission power amplifier on the first principal surface.

5. The radio frequency module according to claim 1, further comprising:
a first reception filter having a first communication band as a passband;
a second reception filter having a second communication band as a passband;
a first switch configured to switch between connection of the reception low noise amplifier and the first reception filter and connection of the reception low noise amplifier and the second reception filter; and
a second switch configured to switch connection and disconnection of an antenna connection terminal and the first reception filter, and switch connection and disconnection of the antenna connection terminal and the second reception filter,
wherein the first switch and the second switch are included in the semiconductor IC, and
the first reception filter and the second reception filter are on the first principal surface.

6. A radio frequency module, comprising:
a module board including a first principal surface and a second principal surface on opposite sides of the module board;
a semiconductor integrated circuit (IC) on the second principal surface; and
an external-connection terminal on the second principal surface,
wherein the semiconductor IC includes a third principal surface and a fourth principal surface on opposite sides of the semiconductor IC,
the third principal surface faces the second principal surface, and is closer to the second principal surface than the fourth principal surface, and
the semiconductor IC includes
a reception low noise amplifier, and
a first ground electrode on the fourth principal surface,
wherein the semiconductor IC further includes:
a second ground electrode on the third principal surface; and
a via conductor in the semiconductor IC, the via conductor being connected to the first ground electrode and the second ground electrode, and
wherein in a plan view of the fourth principal surface,
the fourth principal surface is polygonal,
the first ground electrode being one of a plurality of ground electrodes on the fourth principal surface,
the first ground electrode is in a first edge region that includes a first edge among a plurality of edges of the fourth principal surface, and
an other ground electrode of the plurality of ground electrodes is in a second edge region that includes a second edge facing the first edge among the plurality of edges of the fourth principal surface.

7. The radio frequency module according to claim 6, wherein in a plan view of the second principal surface,
the module board is polygonal,
the external-connection terminal being one of a plurality of external-connection terminals on the second principal surface,
the plurality of external-connection terminals are not in (i) a third edge region of the module board located between the first edge and a third edge that is included in a plurality of edges of the second principal surface and is most closely facing the first edge, nor (ii) a fourth edge region of the module board located between the second edge and a fourth edge that is included in the plurality of edges of the second principal surface and is most closely facing the second edge, and
the plurality of external-connection terminals are in an edge region on the module board other than the third edge region and the fourth edge region.

8. A communication device, comprising:
a radio frequency (RF) signal processing circuit configured to process a radio frequency signal which is to be transmitted by an antenna and a radio frequency signal which has been received by the antenna; and
a radio frequency module configured to transfer the radio frequency signals between the antenna and the RF signal processing circuit, the radio frequency module including
a module board including a first principal surface and a second principal surface on opposite sides of the module board, the module board being connected to a motherboard,
a semiconductor integrated circuit (IC) on the second principal surface, and
an external-connection terminal on the second principal surface,
wherein the semiconductor IC includes a third principal surface and a fourth principal surface on opposite sides of the semiconductor IC,
the third principal surface faces the second principal surface, and is closer to the second principal surface than the fourth principal surface, and
the semiconductor IC includes
a reception low noise amplifier, and
a first ground electrode on the fourth principal surface,
wherein the external-connection terminal is connected to the motherboard and the first ground electrode is also connected to the motherboard.

9. The communication device according to claim 8, wherein the semiconductor IC further includes:
a second ground electrode on the third principal surface; and
a via conductor in the semiconductor IC, the via conductor being connected to the first ground electrode and the second ground electrode.

10. The communication device according to claim 9, wherein in a plan view of the fourth principal surface,
the fourth principal surface is polygonal,
the first ground electrode being one of a plurality of ground electrodes on the fourth principal surface,
the first ground electrode is in a first edge region that includes a first edge among a plurality of edges of the fourth principal surface; and
an other ground electrode of the plurality of ground electrodes is in a second edge region that includes a second edge facing the first edge among the plurality of edges of the fourth principal surface.

11. The communication device according to claim 10, wherein in a plan view of the second principal surface,
the module board is polygonal,
the external-connection terminal being one of a plurality of external-connection terminals on the second principal surface,
the plurality of external-connection terminals are not in (i) a third edge region of the module board located between the first edge and a third edge that is included in a plurality of edges of the second principal surface and is most closely facing the first edge, nor (ii) a fourth edge region of the module board located between the second edge and a fourth edge that is included in the plurality of edges of the second principal surface and is most closely facing the second edge, and the plurality of external-connection terminals are in an edge region on the module board other than the third edge region and the fourth edge region.

12. The communication device according to claim 8, wherein the semiconductor IC further includes:

a second ground electrode on the third principal surface; and a lateral surface electrode on a lateral surface of the semiconductor IC, the lateral surface electrode being connected to the first ground electrode and the second ground electrode.

13. The communication device according to claim 8, wherein the radio frequency module further comprising:

a transmission power amplifier on the first principal surface.

14. The communication device according to claim 8, wherein the radio frequency module further comprising:

a first reception filter having a first communication band as a passband;

a second reception filter having a second communication band as a passband;

a first switch configured to switch between connection of the reception low noise amplifier and the first reception filter and connection of the reception low noise amplifier and the second reception filter; and a second switch configured to switch connection and disconnection of an antenna connection terminal and the first reception filter, and switch connection and disconnection of the antenna connection terminal and the second reception filter, wherein the first switch and the second switch are included in the semiconductor IC, and the first reception filter and the second reception filter are on the first principal surface.

\* \* \* \* \*